March 23, 1926.
W. P. CAMPBELL
1,577,822
AUTOMOBILE STEERING MECHANISM
Original Filed Jan. 29, 1923
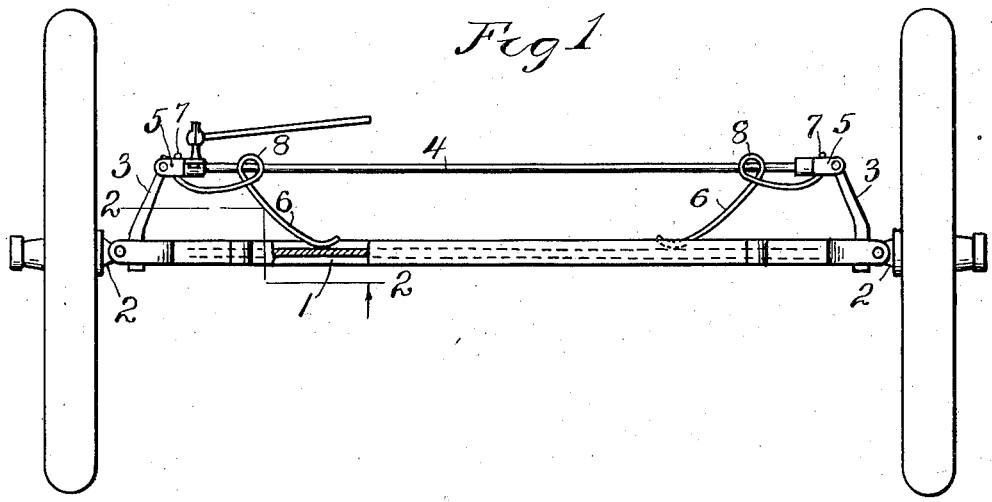
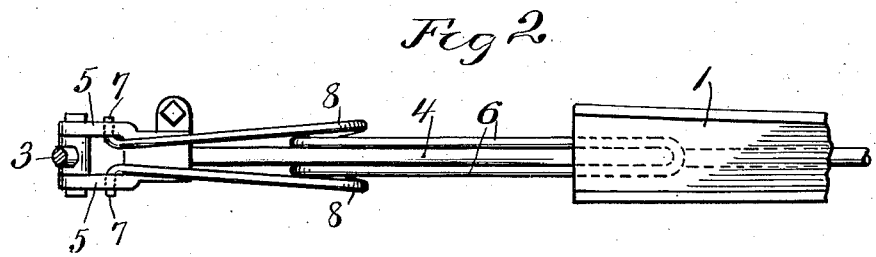
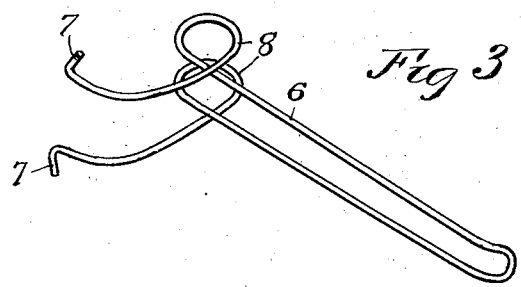
INVENTOR.
William P. Campbell
BY
Warren D. House,
His ATTORNEY.
Witness:
R. E. Hamilton Patented Mar. 23, 1926.

1,577,822

UNITED STATES PATENT OFFICE.

WILLIAM P. CAMPBELL, OF MARCELINE, MISSOURI, ASSIGNOR TO JOHN H. LANE, OF KANSAS CITY, MISSOURI.

AUTOMOBILE STEERING MECHANISM.

Original application filed January 29, 1923, Serial No. 615,594. Divided and this application filed June 18, 1925. Serial No. 37,897.

*To all whom it may concern:*

Be it known that I, WILLIAM P. CAMPBELL, a citizen of the United States, residing at Marceline, in the county of Linn and State of Missouri, have invented a certain new and useful Improvement in Automobile Steering Mechanisms, of which the following is a specification.

My invention relates to improvements in automobile steering mechanisms.

This is a divisional application of an application filed by me January 29, 1923, Serial Number 615,594 for an improvement in anti-vibrating devices for automobile steering mechanisms.

One of the objects of my invention is to provide a device of novel structure which will yieldingly hold the steering spindles of an automobile from movement in either direction from any position in which the latter may be set, and which will hold said spindles from lateral vibration or "shimmying".

A further object of my invention is to provide a novel device of the kind described, which is simple, cheap to make, durable, not liable to get out of order, which may be readily applied to machines now in use, and which will exert a substantially uniform resistance to the movement of the steering arms in either direction and hold them from movement from any position while permitting easy steering of the machine.

The novel features of my invention are hereinafter fully described and claimed.

In the accompanying drawing, which illustrates my invention.

Fig. 1 is a plan view, partly broken away of my improved steering mechanism shown applied to the front axle of an automobile of the usual type.

Fig. 2 is a view on the line 2—2 of Fig. 1, enlarged.

Fig. 3 is a perspective view of one of the springs.

Similar reference characters designate similar parts in the different views.

1 designates the front axle of the double channel or I beam type, such as is employed in certain automobiles now on the market, and to which are pivoted in the usual manner two spindles 2, each having a steering arm 3. 4 designates the usual steering connecting rod having at its respective ends two pairs of arms 5, said pairs being respectively pivoted to the adjacent steering arms 3.

A spring comprising a U-shaped spring wire designated by 6, Fig. 3, has its middle portion disposed in the rear channel of the axle 1 and has a sliding bearing against the axle adjacent to the adjacent steering arm 3.

The arms of each of the two springs 6 extend rearwardly between the adjacent arms 5 of the connecting rod 4 and are respectively provided at their ends with angular extensions 7. The extensions 7 of each spring 6 bear against the rear side of the connecting rod 4 and respectively against the arms 5.

The arms of both springs 6 also bear against the front side of the connecting rod 4.

Each spring 6 has its arms preferably respectively provided with coils 8. The coils 8 of each spring 6 are disposed respectively above and below the connecting rod 4, and serve to prevent accidental disengagement of the springs from the connecting rod 4 and axle 1.

In applying the springs to the automobile, they are sprung into their operative positions, so that each spring bears firmly against the axle and against the front and rear sides of the connecting rod 4. By means of this construction, each of the springs 6 provides a uniform resistance to the swinging movement of the steering arms 3 in either direction throughout their range of movement and in any position of the steering arms, thereby tending to hold the steering arms in any position to which they may be adjusted, without, however, interfering with the free and easy steering of the machine and preventing "shimmying" or lateral vibration of the steering arms 3.

In the operation of the device, the parts having been assembled as above described, when the steering connecting rod 4 is shifted lengthwise in either direction, in the operation of the steering, the springs 6 will slide along the axle 1, and by reason of their tension and of their braking pressure against the axle will hold the connecting rod, and through it the steering arms 3 from "shimmying" or lateral vibration, and will also hold the same in the positions to which they may be adjusted. In addition to their function of effecting a tension in the spring 6, the angular extensions 7 also prevent detachment of the springs from the connecting rod 4, in case the springs should accidentally become detached from the axle.

I do not limit my invention to the structure shown and described, as many modifications, within the scope of the appended claim, may be made without departing from the spirit of my invention.

What I claim is:—

In a device of the kind described, the combination with the front axle, a spindle pivoted thereto having a steering arm, and a steering connecting rod having two arms pivoted to said steering arm, of a spring extending between the said arms of the connecting rod and bearing against the rear sides thereof and bearing against the front side of connecting rod, and having a sliding bearing against said axle.

In testimony whereof I have signed my name to this specification.

WILLIAM P. CAMPBELL.